UNITED STATES PATENT OFFICE.

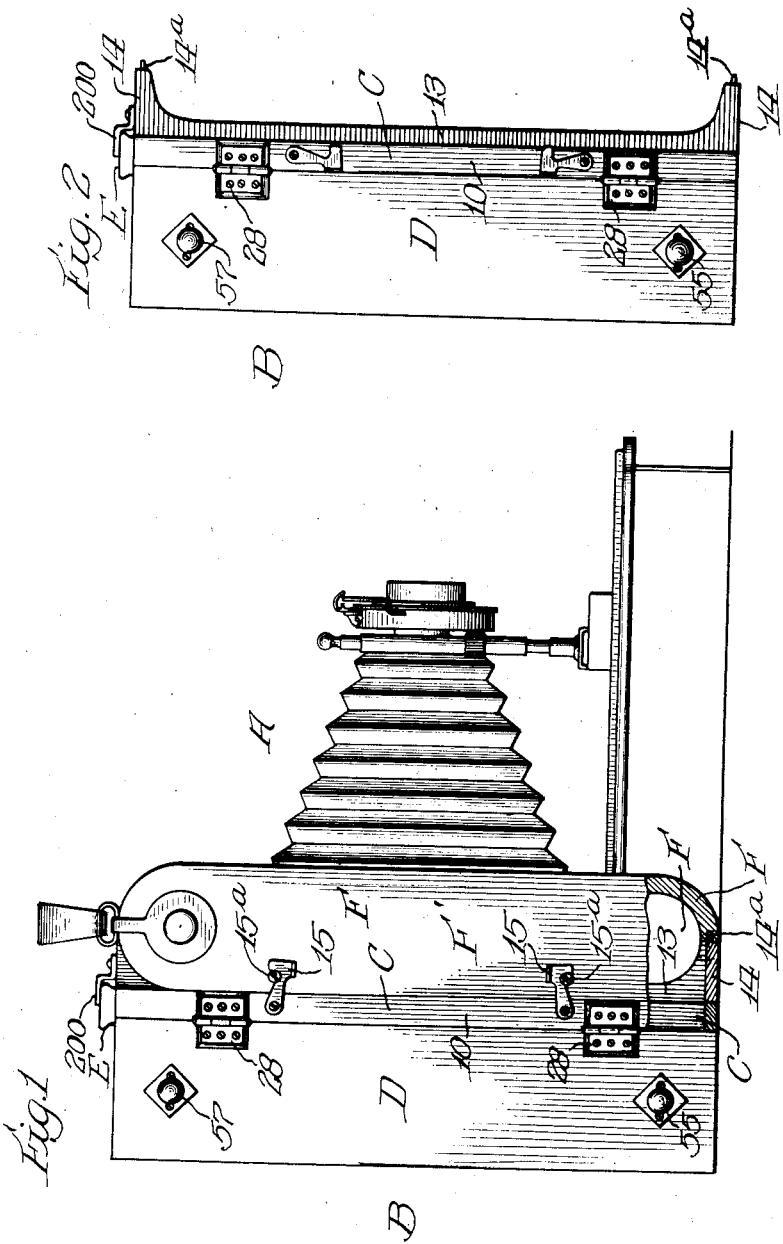

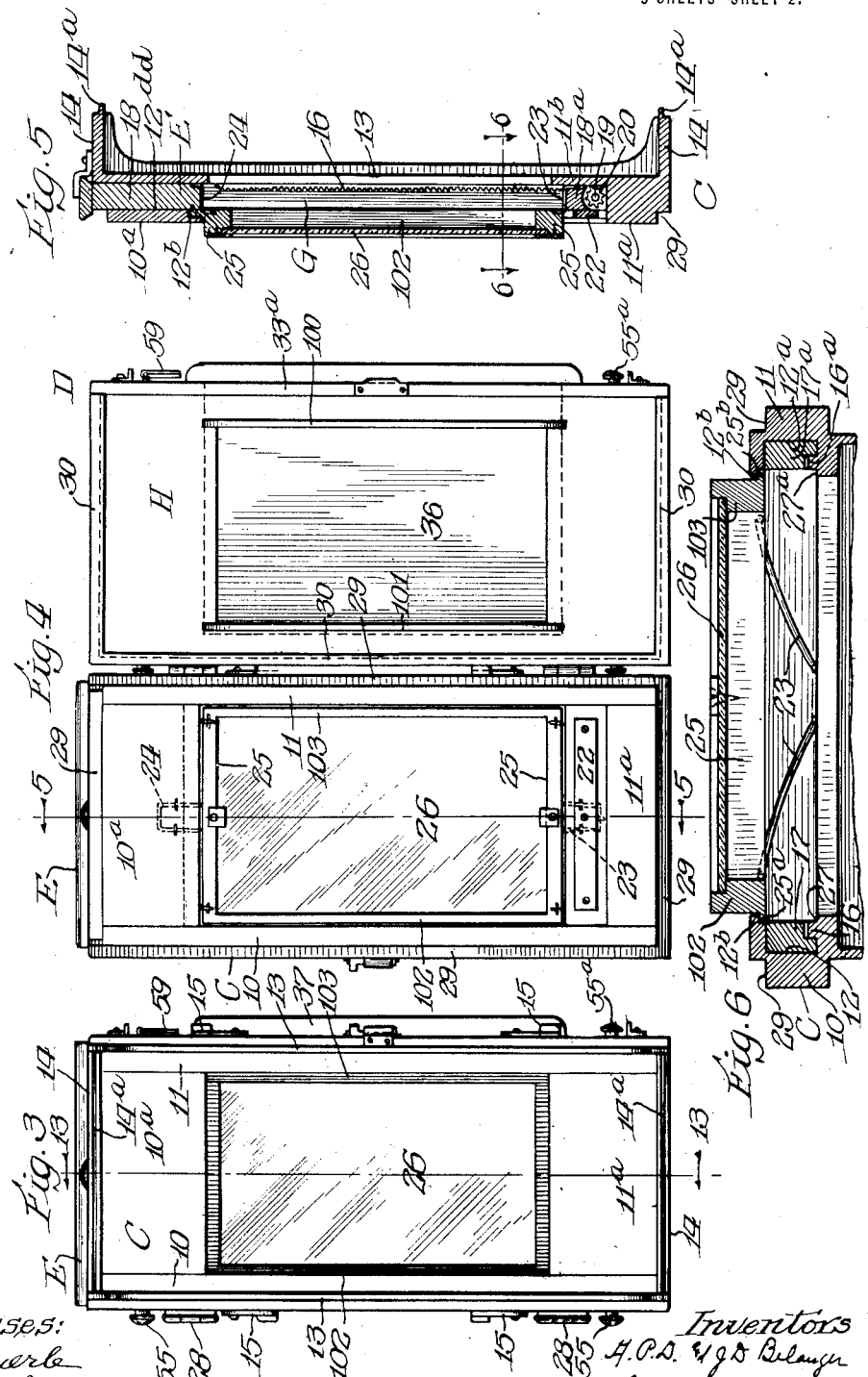

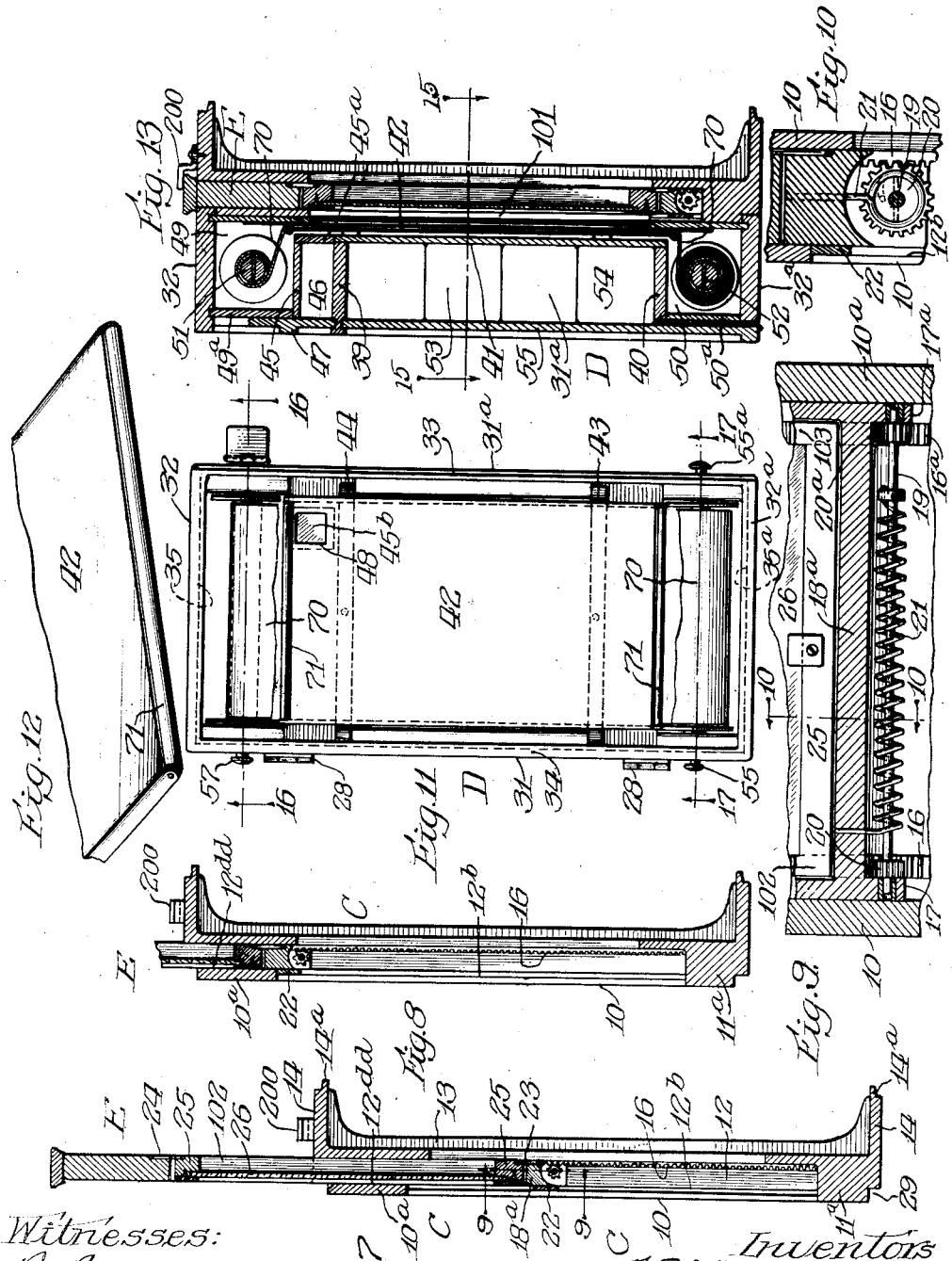

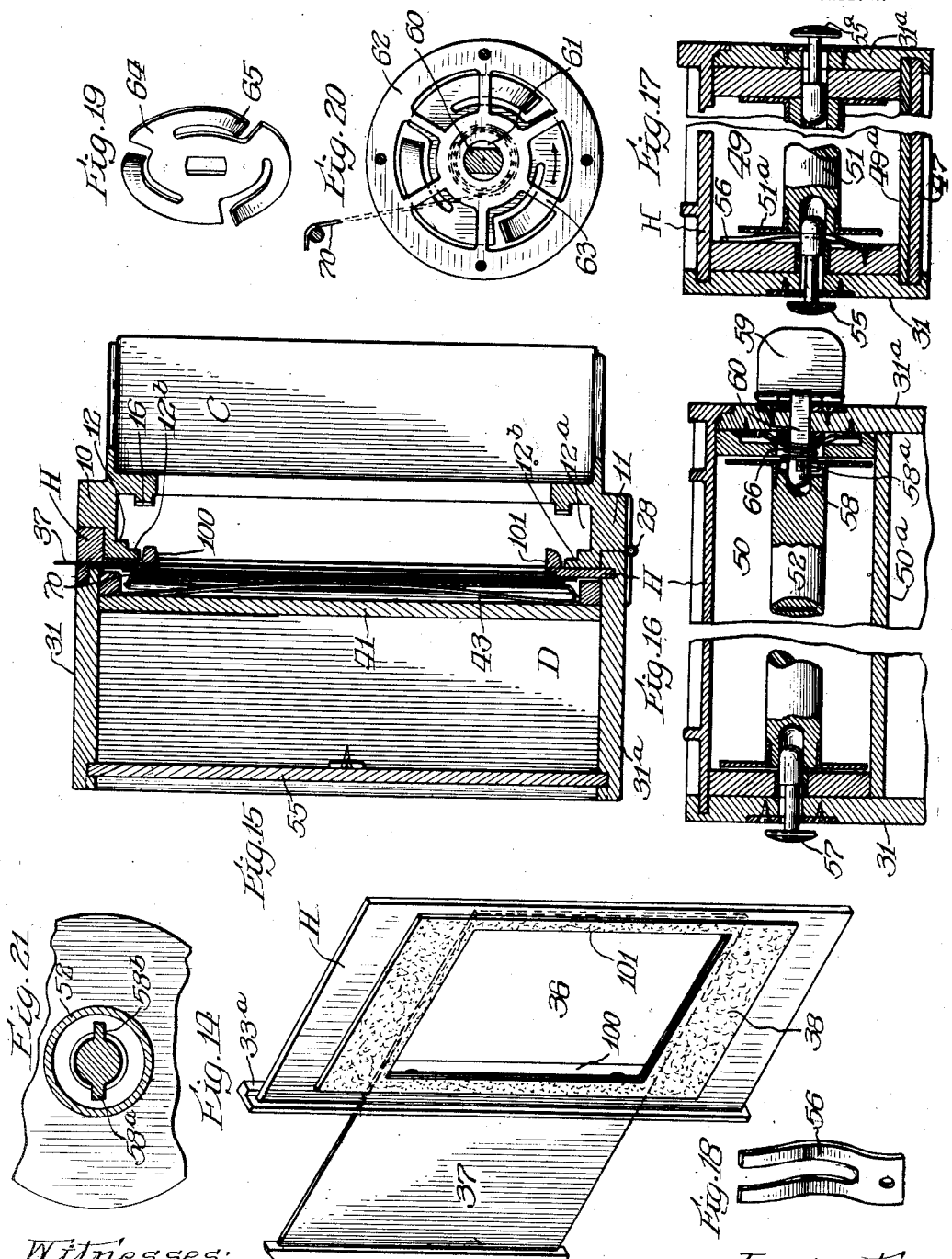

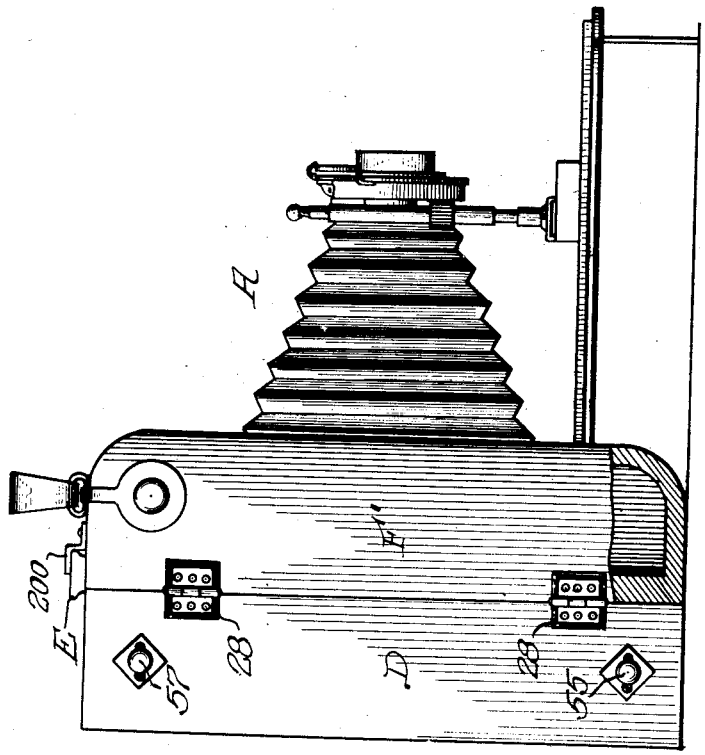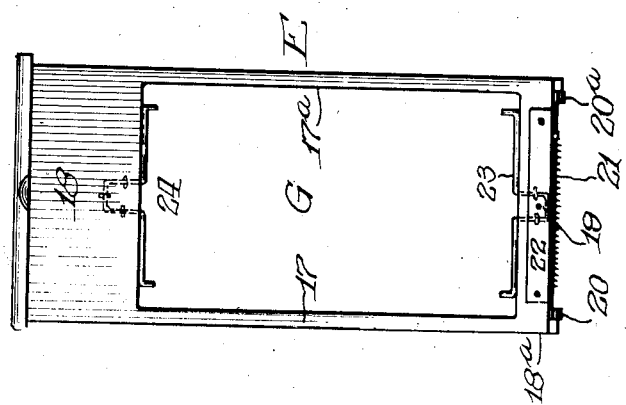

ALBERT P. D. BELANGER AND JOHN D. BELANGER, OF CHICAGO, ILLINOIS.

FILM-BACK FOR CAMERAS.

1,170,039.     Specification of Letters Patent.     Patented Feb. 1, 1916.

Application filed June 4, 1915. Serial No. 32,095.

*To all whom it may concern:*

Be it known that we, ALBERT P. D. BELANGER and JOHN D. BELANGER, citizens of the United States, and residents, respectively, of the city of Chicago, in the county of Cook and State of Illinois, have invented a certain new and useful Improvement in Film-Backs for Cameras; and we do hereby declare that the following description of our said invention, taken in connection with the accompanying sheets of drawings, forms a full, clear, and exact specification, which will enable others skilled in the art to which it appertains to make and use the same.

Our invention relates generally to improvements in focusing film back for cameras, and it consists, essentially, in the novel and peculiar combination of parts and details of construction, as hereinafter first fully set forth and described and then pointed out in the claims.

In the drawings already referred to, which more fully disclose the details of our invention, Figure 1 is a side elevation of a typical film camera, to which our invention has been attached. Fig. 2 is a like elevation of the invention *per se*. Fig. 3 is a front elevation of our device. Fig. 4, an elevation of the same swung apart, disclosing the focus ground glass, the slide for the film carrier and other details. Fig. 5 is a longitudinal, vertical section at line 5—5 of Fig. 4. Fig. 6 is a horizontal, transverse section at line 6—6 of Fig. 5. Fig. 7 is a section on the same section line as Fig. 5, but with the focus ground glass and frame partly withdrawn and Fig. 8 is a like section with the said focus ground glass and frame wholly withdrawn. Fig. 9 is a section of a fragment at line 9—9 of Fig. 7. Fig. 10 is a section of a fragment at line 10—10 of Fig. 9. Fig. 11 is a front view of the film carrier detached, with its sliding cover withdrawn. Fig. 12 is a perspective view of a portion of a film pressure plate employed in the film carrier. Fig. 13 is a vertical, longitudinal section of our invention in line 13—13 of Fig. 3. Fig. 14 is a perspective view of the sliding cover for the film carrier disclosed in Fig. 13. Fig. 15 is a horizontal transverse section (with the focus ground glass and its sliding frame withdrawn) at line 15—15 of Fig. 13. Fig. 16 is a cross-section at line 16—16 of Fig. 11 and Fig. 17 is a like section at line 17—17 of said Fig. 11. Fig. 18 is a perspective of a detail employed in the film carrier, while Figs. 19, 20, and 21 are likewise views of details of construction embodied in said film box or carrier. Fig. 22 is a plan of the ground glass slide and Fig. 23 is a side elevation of a camera with parts of our invention formed integral therewith.

Like parts are designated by corresponding characters or symbols of reference in all the figures of the drawings.

The process of focusing a camera of the well known pocket type, such as the Kodak, Premo, Bulls Eye, Hawk, and the like, is, as a matter of fact, a mere matter of guess or approximation. On such cameras there is arranged one of several types of graduated devices, the graduations thereon indicating various foci, and there is provided a stop adapted to be set at any of these graduations. In connection with the camera front is arranged a stop adapted to contact with the first named stop. Now assuming such a camera to be set up to make an exposure, it becomes necessary for the operator to guess at the proper focal length and to set the camera front at a point on the graduated device, designative of the approximated focus. And, it is a well known fact that, except in the case of trained men; the approximation of distance is notoriously inaccurate; particularly so in the case of amateurs, and it is a further fact that amateurs without number have ceased amateur photography simply due to the spoiling of roll after roll of negative film because of improper focusing. If, however, cameras such as described were possessed of a ground glass whereon the image might be projected and the operator given an opportunity to properly focus the camera until a perfectly distinct image were shown on the ground glass, and means of extreme simplicity provided to automatically remove the ground glass prior to making an exposure, then one of the bug-bears of amateur photography with this type of cameras would be removed.

It is therefore the object of our invention to produce a film carrier and an open frame hinged thereto, carrying an automatically longitudinally adjustable ground glass mounted in a movable slide. This frame is adapted to fit the back of the camera and to make a light tight joint therewith. During the period of focusing, the film carrier is swung out of the way to afford access to the ground glass for obvious reasons. As the film carrier is swung into position against the said frame, means are provided in connection with the film carrier to force the ground glass away from the focal plane occupied during the focusing process, whereupon the sensitized face of the film to be exposed will become placed in the same plane formerly occupied by the adjacent face of the ground glass. Other means in connection with the ground glass frame are provided whereby the said frame will be automatically slidably retreated from the field of vision within the camera. In the face of the film carrier is provided a slide similar to that in a plate holder, which when withdrawn will expose the film, and said film will be in precisely the same focal plane as was the ground glass, so that the image produced upon the film after proper exposure will have the same clarity of detail as was possessed by the image projected upon the ground glass.

To better understand our invention we now refer to the drawings, in which—

A indicates in general the type of camera herein referred to and B our newly invented focusing film back as attached to said camera. This film back is composed of two hinged together independent parts C and D, the former being an open frame within which is maintained a ground glass and its appurtenances, and the latter a case or box termed the film carrier, within which is located a roll of sensitive film together with necessary means for maintaining the same.

The open frame C comprises two longitudinal strips 10 and 11, maintained in spaced apart parallel relationship and connected together by top and bottom cross members 10$^a$ and 11$^a$. On the outer face of the frame C these members 10$^a$ and 11$^a$ are of equal width as clearly seen in Fig. 3, while on the inner face the member 11$^a$ is rabbeted as at 11$^b$ as indicated in Fig. 5. The longitudinal strips 10 and 11 are provided on their near, inner or facing edges with longitudinal grooves 12 and 12$^a$ extending from the rabbeted portion 11$^b$ to the end of said strips, there being an open, through space or cavity 12$^{dd}$ formed in the cross member 10 extending the entire length and width thereof and merging into the grooves 12 and 12$^a$, said space being arranged for the passage therethrough of a ground glass slide E hereinafter described. On the upper faces of the strips 10 and 11 along the inner edges thereof are produced longitudinal rabbets 12$^b$ and 12$^c$ for purposes hereinafter more fully referred to.

On the outer face of the frame C are provided longitudinal and transverse fins 13 and 14, respectively, the latter having tongues 14$^a$, which fins and tongues are adapted to engage the walls F of the camera case F' of the camera A and to form a light tight joint between said case and said frame C. Hooks 15 and coacting pins 15$^a$ or like means are employed to fasten the frame C to the camera case F', and it is now to be understood that if desired we may make the frame C as an integral part of the camera case F', as seen in Fig. 23, so as to produce the camera in the first instance with the focusing media, without departing from the scope or spirit of our invention.

The ground glass slide E above mentioned is adapted to slide through the space 12$^{dd}$ of the member 10$^a$ of the frame C and in the grooves 12 and 12$^a$ of the members 10 and 11 and its inward movement is estopped by contacting with the member 11$^a$ as seen in Fig. 5, and it may be explained that the lower faces of the grooves 12 and 12$^a$ of frame C are provided with toothed rack bars 16 and 16$^a$, which extend from the facing edge of cross member 10$^a$ to the like edge of member 11$^a$.

The slide E is composed of a pair of parallel longitudinal strips 17 and 17$^a$ and maintained in spaced apart disposition by upper and lower cross members 18 and 18$^a$. The longitudinal strips project slightly beyond member 18$^a$ to provide journals for a transverse shaft 19, on which are fixed adjacent to the inner faces of the strips 17 and 17$^a$ toothed pinions 20 and 20$^a$; and, embracing said shaft is a long helical spring 21, one end of which is fixed to the member 18$^a$ and the other to said shaft 19, so that, as the slide is introduced into the frame C, and the pinions 20 and 20$^a$ engage the racks 16 and 16$^a$, the said spring will become "wound up" as it were and placed in torque by the time that the slide has been moved its entire distance within said frames. It is obvious that if contact with said slide be removed the torque in said spring will rotate shaft 19 and pinions 20 and 20$^a$, and they, coacting with the racks 16 and 16$^a$, will force the withdrawal of said slide in an evident manner, until an obstruction is encountered, and this obstruction is provided in the form of a removable ledge 22 on the top face of the member 18$^a$, which ledge is intended to contact with the inner edge of cross member 10$^a$ of the frame C, thus preventing further withdrawal of said slide.

Located at either end of rectangular opening G, produced by the components of the slide E, are V-shaped blade springs 23 and 24 centrally fixed underneath and flush with the bottom surface of the members 18 and 18$^a$, the free legs of which springs incline upwardly in opposite directions adjacent the inner edges of said members.

Upon the free legs of the springs 23 and 24 rests a rectangular ground glass frame 25 in which is maintained a ground glass 26, which frame is of a size to freely fit in opening G of the slide E and to be vertically movable therein, there being lips 25$^a$ and 25$^b$ on opposite lower edges of said frame, which are adapted to engage the longitudinal rabbets 12$^b$ and 12$^c$ adjacent the grooves 12 and 12$^a$ of the frame C, in order to limit the upward movement of said frame 25 under the impetus of the springs 23 and 24; and, upon the application of pressure upon said ground glass it is evident that the same will be depressed from the lips 25$^a$ and 25$^b$ and will rest upon the inner edges 27 and 27$^a$, in which instance it will be found that upper and lower faces of the frame 25 will be coincident with the like surfaces of the frame E, so that there will be no impediment or obstruction to the withdrawal of the frame E from the frame C except the limiting stop 22 already mentioned.

The object of rendering the ground glass outwardly movable to a certain extent, the limit of such movement being the engaging or contacting edges of the lips 25$^a$ and 25$^b$ with the ledges or rabbets 12$^b$ and 12$^c$, Fig. 6, is to establish the said glass in a focal plane, which can be automatically reached by the film upon the swinging into contact with the frame C of the film carrier D, which is hinged to said frame C by hinges 28, and it may be added that the rear face of the frame C is formed with a continuous rabbet 29 around its outer edges which rabbet coacts with raised ribs 30 on the edges of the film carrier D to effect a light tight joint at the jointure of the said frame and film carrier.

The film carrier D is of the same width and height as the frame C and consists of side walls 31 and 31$^a$ and end walls 32 and 32$^a$. On the inner faces of walls 31, 32 and 32$^a$, near the upper edges thereof are formed grooves 34, 35, and 35$^a$ for the slidable reception of a cover H for said carrier, there being a rabbet 33 coöperating with a ledge 33$^a$ to insure light tight joints in an obvious manner. The cover H is provided with an opening 36 through which the exposure is made, and this opening is closed and opened by a slide 37. On the under face of the cover H; i. e. that face on the interior of the film carrier, and surrounding the opening 36 there is provided a layer of plush 38 against which the film in the carrier is automatically pressed during the making of an exposure, so as to prevent any light rays fogging the film on either side of the opening 36.

Within the carrier D are provided two upstanding partitions 39 and 40, transversely of and connecting side walls 31 and 31$^a$, care having been taken to make the joints light tight, and upon these partitions is placed a fixed light tight top member 41. These partitions and top are arranged below the opening 36 in the cover H; and, freely supported on said top is a sheet metallic pressure plate 42, which plate is equal to the width of the film and overlaps said top at each end. Fixed to the under side of this plate are bow springs 43 and 44, the free ends of which springs rest upon said top 41 and tend to force said pressure plate into close contact with the plush 38 on the carrier cover H. It will thus be observed that if a film be interposed between the pressure plate 42 and the plush surface 38, the pressure created by the springs 43 and 44 will tightly press said film against the plush and render the film perfectly flat and free from the curled edges and waviness of surface as now exists with all film holders. This flattening of the film insures the same an exposure at precisely the same focus throughout the entire area thereof in an obvious manner.

Parallel to partition 39 and extending from side wall 31 to 31$^a$ is located a partition 45 closed by a bottom 45$^a$, in which is located an opening closed by red or non-actinic glass 45$^b$, there being a like opening 48 through the pressure plate 42, whereby the film numerals now usually imprinted on the backs of regulation films, may be distinguished from the back of the film carrier, there being a sliding cover 47 to close the chamber 46 formed by the partitions 45 and 39.

In the ends of the film carrier between walls 32 and 45, and 32$^a$ and 40, respectively, are formed transverse compartments 49 and 50, for the reception of the unwinding and the winding film rollers 51 and 52, respectively, and the bottoms of these compartments are closed by fixed closures 49$^a$ and 50$^a$. The compartment 53 created by the partitions 39 and 40, and member 41 is adapted for the reception of extra rolls of film 54, and said compartment is closed by a sliding bottom member 55.

In Fig. 17 is disclosed the details installed in compartment 49 in which the unwinding film roller 51 is rotatably mounted upon slidably mounted pins 55 and 55$^a$, the pins being slidably arranged in the walls 31 and 31$^a$ to permit the removal of roller 51, when it is desired to remove and replace the same.

Embracing the pin 55 and fixed to the wall 31 is a bowed spring 56, the bowed portion of which impinges against flange 51$^a$ of unwinding film roller 51 to create frictional resistance to the rotation of said roller.

In the compartment 50, Fig. 16, the winding roll 52 is rotatably mounted adjacent wall 31 on a retreatable pin 57 of a construction similar to that of pins 55 and 55ª, but in wall 31ª, a rotatable pin 58, having an external finger grip 59 for rotative purposes, is provided. At its inner engaging end, this pin is cylindrical and is formed with driving lugs 58ª engaging recesses 58ᵇ in the ends of the driving roller 52 to rotate the same. While the said pin is cylindrical at its inner engaging end, it is of rectangular cross section for the remainder of its length as seen at 60.

To the inner face of wall 31ª concentrically with pin 58 and possessing an axial annular aperture 61 of sufficient diameter to permit the passage through and rotation therein of the rectangular portion 60 of the pin 58, there is fastened a disk 62 having a plurality of radial spokes 63, as it were. Non-rotatably though slidably engaging the rectangular section 60 of the pin 58 is a smaller disk 64 possessed of a plurality of facial projections 65, which projections gradually merge into the plane of the disk 64, as clearly seen in Fig. 19. Embracing the pin 58 between the lugs 58ª thereon and the disk 64 is a compression helical spring 66, the double purpose of which is to maintain the disk 64 in facial contact with the disk 62 and also to maintain the lugs 58ª within the recesses 58ᵇ of the film roller 52.

Now assuming a film 70 as being partially unwrapped upon the unwinding roller 51, with its end extending over the pressure plate 42, and partially wrapped upon the winding roller 52 in the manner indicated in Figs. 13 and 20, it will be observed that said film has a tendency to come in sharp contact with the edges of the pressure plate 42, creating a tendency to tear or rip the film. To avoid this liability anti-friction rollers 71, Fig. 12, are journaled to the pressure plate. It having already been explained that the unwinding roller 51 is provided with frictional means resisting rotation thereof, it is evident that a rotation of roll 52 in the direction indicated in Fig. 20 will create a tension in the film 70, with the result that the pressure plate 42 will be depressed and its supporting springs 43 and 44 compressed, thereby removing said film from contact with the plush 38 on the cover H and preventing the sensitized face of said film from becoming streaked or scratched as the process of winding upon roll 52 proceeds. It has also been explained that the disk 64 rotating with said roll is maintained in spring pressed facial contact with the stationary disk 62. If now the rotation of roll 52 be discontinued, the tension existing in the film 70 will instantly induce a retrograde rotation of said roller until the projections 65 on disk 64 engage the spokes 63 of the stationary disk 62, thereby removing the tension in the film 70 and permitting the pressure plate 42 to again press the film squarely against the plush 38, so that the said film presents a perfectly plane surface free from curls or wrinkles upon the exposure thereof. The structure performing the functions just described, is an essential of our invention, as the undulating surface of films as now employed in cameras presents a plurality of foci, by reason of which certain portions of said films disclose the photographed image with greater distinctness than others. It is a fact that professional photographers, employing large cameras, and photographing panoramic pictures in which large glass plates are now a necessity, would gladly substitute films, but for the objection stated above, because of the reduction in weight of the film over the glass plates and also the security from breakage which is ever present in the manipulation of such glass plates. And it is now pointed out that our invention is not limited to the small pocket cameras of the types herein stated, but is equally as applicable to the wider and more comprehensive range of work of the professional.

In the broad statement of function set forth in this specification, it was stated that when in readiness for exposure, the sensitized face of the film will lie in the precise plane of the adjacent face of the focusing ground glass. This result is accomplished as follows: On the outer face of cover H on opposite sides of the opening 36 there are arranged upstanding ribs 100 and 101 Figs. 4, 13, 14, 15. The spacial separation of these ribs is the same as the spacial separation of the marginal members 102 and 103, Fig. 6 of the ground glass frame 25. And, when the film box D is swung about its hinges to be brought into intimate facial contact with the frame C, these ribs 100 and 101 contact with the marginal members 102 and 103 and forces the frame 25 with the ground glass 26 into the ground glass slide E until the same is fully retreated thereinto and flush with the upper and lower surfaces of said slide. As this function is performed, all obstruction to the slidable movement of the slide E through the frame C is removed, whereupon the tightly wound or tensioned spring 21 on the shaft 19, Fig. 9, will induce rotation thereof and of the pinions 20 and 20ª thereon, which pinions coacting with the racks 16 and 16ª, will enforce the movement of the slide E until the same is without the range of vision in the camera A. It now only remains to be stated that the distance of the sensitized face of the film 70 from the outer face or front of the carrier D is such that when the carrier is brought into close contact with the frame C, the said face of the film will lie in the plane of the removed ground glass.

Herein we have disclosed a practical structure capable of and fully performing the various functions of our invention, yet it is obvious that many changes in details of construction producing the same result, may be made and we therefore wish it understood that we consider all such changes or alterations as within the skill of one practised in the art, and are therefore to be considered as falling within the spirit and scope of our invention; for instance, we have in mind that instead of hinging together the frame C and film carrier D, the same may equally well be arranged in slidable engagement with each other. Likewise that the frame C may be formed integral with the camera case if desired. And, the film carrier D be an independent structure provided with either a tongue or groove along its surrounding facial edges adapted to mate with similar media on the back face of the frame C to secure light tight joints and provided with hooks or other means to fasten said carrier to said frame.

When the camera is being carried about, it is preferable that the various elements A, C, and D be in connected together relationship for sake of convenience. Inasmuch as the slide E will normally project from frame C when the carrier D is in place, a swivel hook 200, Figs. 7 and 13, is supplied on the frame C to maintain said slide within said frame.

Having thus fully described our invention we claim as new, and desire to secure to ourselves by Letters Patent of the United States:—

1. A camera including a casing, a frame provided with an opening and slidably mounted in the rear of said casing, a second frame provided with a ground glass and movable in said opening, a film carrier in connection with said casing, and adapted to be light tightly engaged therewith, means on said carrier adapted to move said second frame from its normal position, and devices mounted in said casing and adapted to move both frames beyond the line of vision within said camera.

2. A camera including a casing, a frame having an opening therethrough and arranged for transverse movement with respect to said casing and located in the rear of said casing, a ground glass, and a frame therefor, in said opening and movable therein, a film carrier in connection with said casing, and means on said carrier to move said frame and ground glass in a direction away from said carrier.

3. A camera including a casing, a frame having an opening therethrough and arranged for transverse movement with respect to said casing and located in the rear of said casing, a ground glass and guiding means therefor, in said opening and movable therein and spring maintained in said opening in a predetermined position, a film carrier in connection with said casing, and means on said film carrier to move said guiding means and ground glass from said predetermined position.

4. A camera including a casing and a frame in connection therewith at the rear thereof, said frame being movable transversely with respect to said casing and having an opening therethrough, a ground glass and guiding means therefor, in said opening and movable therein, a film carrier in connection with said casing at the rear of said frame, and containing a sensitized film, there being means on said carrier to move said guiding means and ground glass away from said carrier, so that said film may occupy the space theretofore occupied by said ground glass, and guiding means.

5. A camera including a casing, a frame provided with an opening and slidably mounted in the rear of said casing, a second frame provided with a ground glass and movable in said opening, a film carrier in connection with said casing, and adapted to be light tightly engaged therewith, and means on said carrier adapted to move said second frame in a direction away from said carrier.

6. A camera including a casing, a frame having an opening therethrough and arranged for transverse movement with respect to said casing and located in the rear of said casing, a ground glass and guiding means therefor, in said opening and movable therein, a film carrier in connection with said casing, and means on said carrier to move said guiding means and ground glass in a direction away from said carrier, and other devices in connection with said casing to move said frame and ground glass, in a direction transversely of said casing, beyond the line of vision within said camera.

7. A camera including a casing, a frame having an opening therethrough and arranged for transverse movement with respect to said casing and located in the rear of said casing, a ground glass having guiding means thereon, in said opening and movable therein and spring maintained in said opening in a predetermined position, a film carrier in connection with said casing, and means on said film carrier to move said guiding means and ground glass from said predetermined position, and other means, in connection with said casing to move said frame and said ground glass in a direction transversely of said casing beyond the line of vision within said camera.

8. A camera including a casing and a frame in connection therewith at the rear thereof, said frame being movable transversely with respect to said casing and having an opening therethrough, a ground glass having guiding means thereon in said opening and movable therein, a film carrier in connection with said casing at the rear of said frame, and containing a sensitized film, there being means on said carrier to move said ground glass away from said carrier, so that said film may occupy the space theretofore occupied by said guiding means and ground glass, and other means, in connection with said casing, to move said frame and ground glass in a direction transversely of said casing beyond the line of vision within said camera.

9. A camera including a casing, a frame fixed to the rear of said casing, said frame having a passage way, a slide movable in said passage way, there being an opening through said slide, a ground glass having guiding means thereon and movable in said opening and normally projecting beyond said slide parallel to the plane thereof, a film carrier in connection with said frame, and means on said carrier to move said ground glass into said slide.

10. A camera including a casing, a frame fixed to the rear of said casing and having a passage way therein open at one end, a slide movable in said passage way, there being an opening through said slide, a ground glass, having guiding means thereon, in said opening and movable therein and normally located in a predetermined position in said slide parallel to the plane thereof, a film carrier in connection with said frame and means on said film carrier to move said ground glass away from its predetermined position.

11. A camera including a casing, a frame at the rear thereof, a ground glass having guiding means therefor in said frame and movable transversely therein, and adapted to be normally positioned in a predetermined plane, a film carrier, containing a sensitized film, in connection with and hinged relationship to said casing and adapted for light-tight engagement therewith, there being means on said carrier to move said glass from said plane, whereby the said film is permitted to occupy the space so vacated.

12. A camera including a casing, a frame attached to the rear of said casing, a slide movable in said frame, said slide having an opening, a ground glass having guiding means therefor, in said opening and movable therein and normally projecting beyond said slide parallel to the plane thereof, a film carrier hinged to said frame and closable thereagainst, said film carrier having means to move said ground glass into said slide.

13. A camera including a casing, a frame attached to the rear of said casing, a slide movable in said frame, said slide having an opening, a ground glass having guiding means therefor, in said opening and movable therein and normally projecting in a predetermined position beyond said slide parallel to the plane thereof, a film carrier hinged to said frame, containing a sensitized film, and closable against said frame, and means on said carrier to move said ground glass away from said predetermined position, whereby said film may occupy the space so vacated.

14. A camera including a casing, a frame attached to the rear of said casing, a slide movable in said frame, said slide having an opening, a ground glass having guiding means thereon, in said opening and movable therein and normally projecting beyond said slide parallel to the plane thereof, a film carrier hinged to said frame and closable thereagainst, said film carrier having means to move said ground glass into said slide, and devices in connection with said frame to move said slide and ground glass beyond the line of vision within said camera.

15. In combination, a camera including a bellows and a bellows back, of a frame removably attached to the rear of said back, a slide movable in said frame and having an opening, a ground glass and guiding means therefor, in said opening, springs in connection with said slide, pressing against said guiding means and yieldingly maintaining the same in a predetermined position beyond the face of said slide, a film carrier in connection with said frame, and means on said carrier to move said ground glass and means from said predetermined position.

16. In combination, a camera including a bellows and a bellows back, of a frame removably attached to the rear of said back, a slide movable in said frame and having an opening, a ground glass and guiding means therefor, in said opening and movable therein and positioned in a predetermined plane parallel to the plane of said slide, a film carrier in connection with said frame, and means on said carrier to move said ground glass from said predetermined position.

17. In combination, a camera including a bellows and a bellows back, of a frame removably attached to the rear of said back, a slide movable in said frame and having an opening, a ground glass and guiding means therefor, in said opening and movable therein and positioned in a predetermined plane parallel to the plane of said slide, a film carrier adapted to contain a sensitized film, in connection with said frame, and means on said carrier to move said ground glass and means from said predetermined position, whereby the said film may occupy the position from which said ground glass and means was removed.

18. In combination, a film carrier including a hollow rectangular case and a slidable cover in the front thereof, there being an opening in said cover and a slide closing the same, film rollers in opposite ends of said carrier, an outwardly impelled plate between said rollers, whereby a film passing over said plate and said roller, will be forced into contact with said cover.

19. In combination a hollow rectangular case having a front and an opening therethrough a slide closing said opening, means in said case for retaining a film thereon, an outwardly impelled device between said means, whereby said film traversing said device and retained by said means, is forced into close contact with said front.

20. In combination a hollow rectangular case having a front and an opening therethrough adapted to be closed, film carrying devices within said case, and an outwardly spring pressed plate between said devices, whereby a film connected to said devices and traversing said plate is forced into close contact with said front.

21. In combination, a hollow rectangular case having a front and an opening therethrough adapted to be closed, a driving and a driven film roller in said case, and an outwardly impelled plate between said rolls opposite said opening, friction means resisting the rotation of said driven roller, and means in connection with said driving roller and case permitting a limited degree of retrograde movement of said driving rolls.

22. A camera including a casing, a frame fixed to the rear of said casing, said frame having a passage way, a slide movable in said passage way, there being an opening through said slide, a ground glass and guiding means therefor, movable in said opening and normally projecting beyond said slide parallel to the plane thereof, a film carrier in connection with said frame, and means on said carrier to move said ground glass and means into said slide, and devices on said slide engaging means on said frame to move said slide in said passage way of said frame beyond the line of vision within said camera.

23. A camera including a casing, a frame fixed to the rear of said casing, said frame having a passage way, a slide movable in said passage way, there being an opening through said slide, a ground glass and guiding means therefor, movable in said opening and normally projecting beyond said slide parallel to the plane thereof, a film carrier in connection with and in hinged relationship to said frame, and means on said carrier to move said ground glass and means into said slide.

24. A camera including a casing, a frame fixed to the rear of said casing and having a passage way therein open at one end, a slide movable in said passage way, there being an opening through said slide, a ground glass and guiding means therefor, in said opening and movable therein and normally located in a predetermined position in said slide parallel to the plane thereof, a film carrier in connection with said frame and means on said film carrier to move said ground glass and means away from its predetermined position, and means on said slide engaging means on said frame to move said slide through said passage way after said ground glass has been moved from its predetermined position.

25. A camera including a casing, a frame fixed to the rear of said casing and having a passage way therein open at one end, a slide movable in said passage way, there being an opening through said slide, a ground glass and guiding means therefor, in said opening and movable therein and normally located in a predetermined position in said slide parallel to the plane thereof, a film carrier in connection with and in hinged relationship to said frame and means on said film carrier to move said ground glass and means away from its predetermined position.

26. In combination, a hollow case having a front and an opening therein adapted to be closed, means in said case for retaining a film thereon, an outwardly impelled device between said means, whereby a film traversing said device is forced into close contact with said front.

27. A camera including a lens, a bellows and a camera back, a ground glass, a mounting in connection with said back, maintaining said ground glass in a predetermined position, a film carrier at the rear of said mounting and said ground glass, there being means on said carrier to move said ground glass away from said predetermined position in a direction toward said lens.

28. A camera including a lens, a bellows and a camera back, a ground glass, a mounting in connection with said back, yieldably maintaining said ground glass in a predetermined position, a film carrier at the rear of said mounting and said ground glass, there being means on said carrier to move said ground glass away from said predetermined position in a direction toward said lens.

29. A camera including a camera back, a ground glass, a mounting in connection with said back, maintaining said ground glass in a predetermined position, and a film carrier in connection with said mounting, there being means on said carrier to move said ground glass from said predetermined position, and devices coöperating with said mounting to move said ground glass beyond the line of vision within said camera.

30. A camera including a camera back, a ground glass, a mounting in connection with said back, yieldably maintaining said ground glass in a predetermined position, and a film carrier in connection with said mounting, there being means on said carrier to move said ground glass from said predetermined position, and devices coöperating with said mounting to move said ground glass beyond the line of vision within said camera.

In testimony that we claim the foregoing as our invention, we have hereunto set our hands is the presence of two subscribing witnesses.

ALBERT P. D. BELANGER.
JOHN D. BELANGER.

Witnesses:
WILLIAM O. STARK,
W. HARDING.